Feb. 15, 1966     A. G. OSTROGNAI     3,235,653
RESILIENT MOUNTING ARRANGEMENTS FOR ROTATING MACHINES
Filed Jan. 2, 1964     2 Sheets-Sheet 1
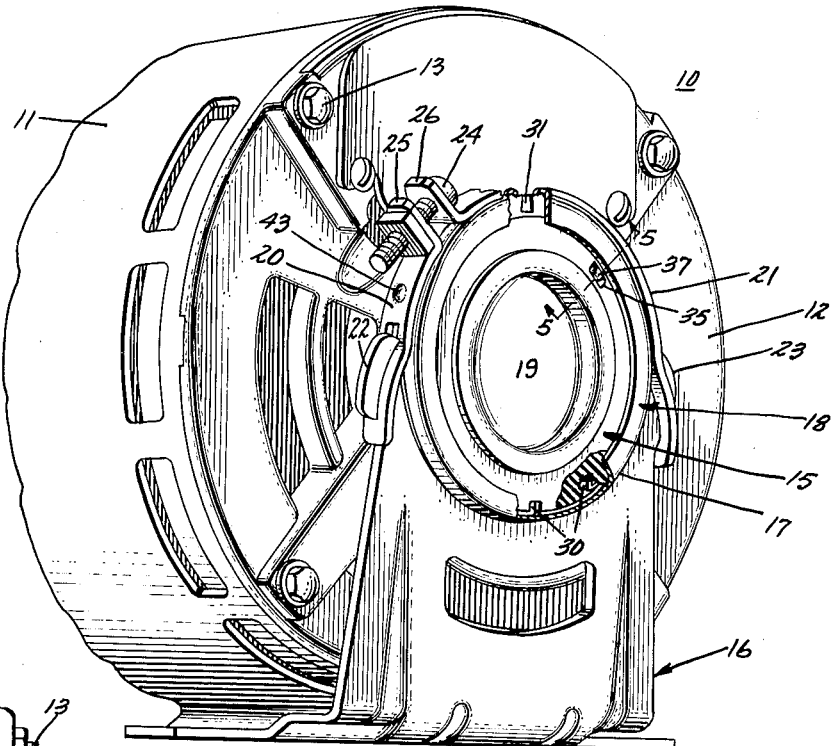
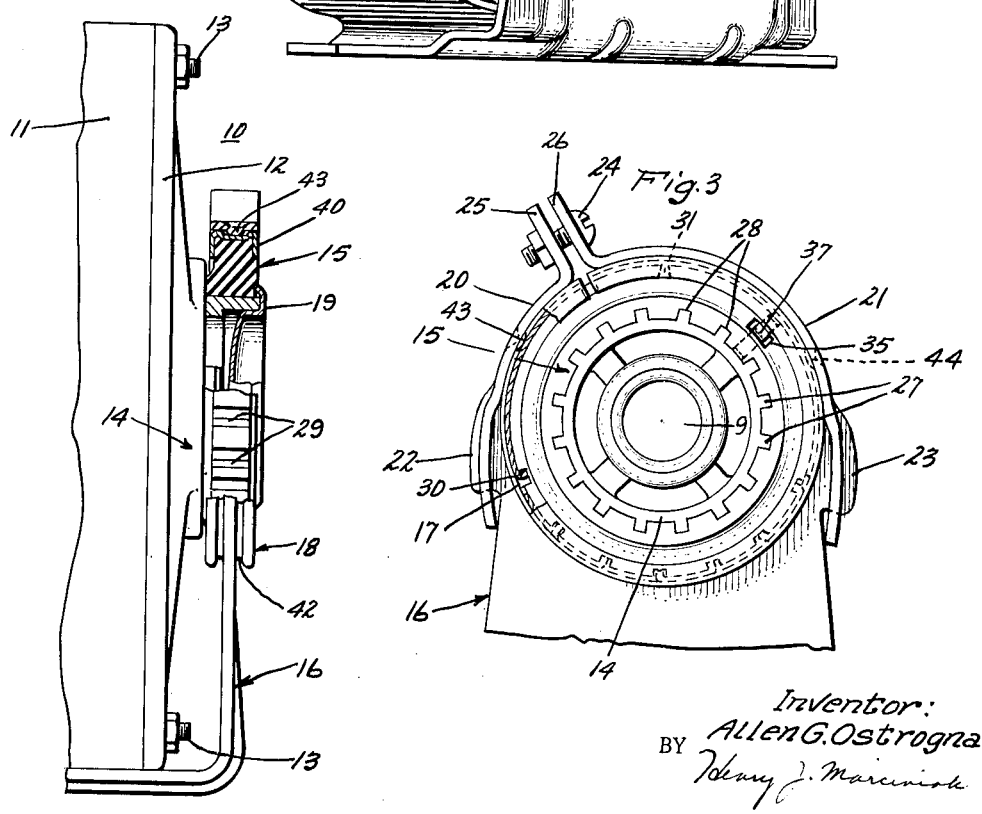
Inventor:
Allen G. Ostrognai,
BY Henry J. Marciniak
Attorney.

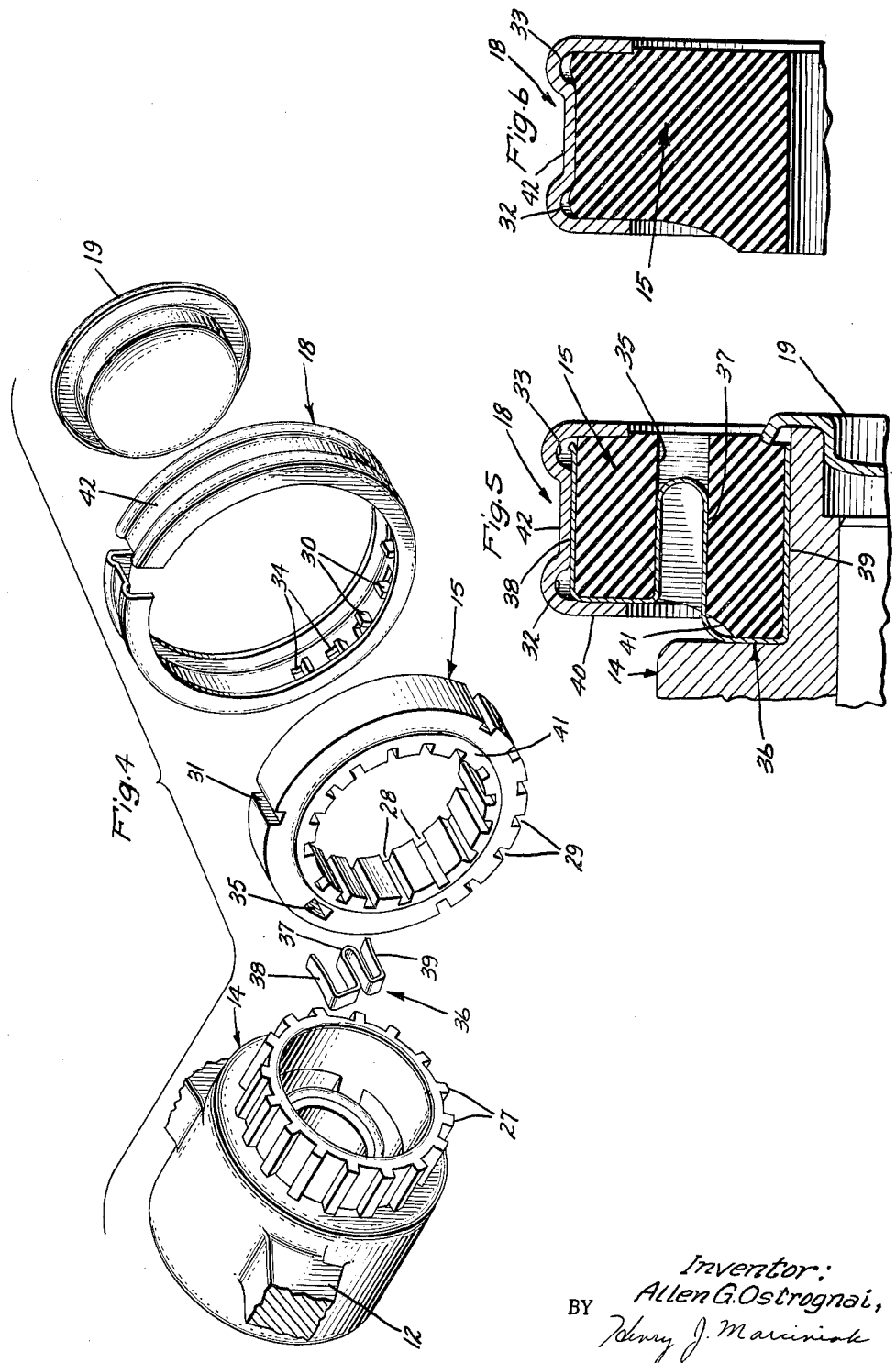

3,235,653
RESILIENT MOUNTING ARRANGEMENTS FOR ROTATING MACHINES
Allen G. Ostrognai, Fort Wayne, Ind., assignor to General Electric Company, a corporation of New York
Filed Jan. 2, 1964, Ser. No. 334,974
6 Claims. (Cl. 174—51)

This invention relates to mounting arrangements for rotating machines and more particularly to a resilient mounting arrangement adapted for rotating machines such as fractional horsepower motors.

In many applications of fractional horespower motors, it is desirable to provide a support arrangement which will resiliently cushion the torsional vibration of the machine as well as provide a relatively rigid support for the motor. A commonly used resilient mounting arrangement for such motors utilizes a rubber annulus and a split metallic ring or band bonded to the outer surface of the annulus. In some designs, another split metallic band is also mounted on the inside diameter of the annulus. The resilient annulus ring is nonrotatably mounted on the hub of the motor and is clamped in a cradle or base arranged to support the annulus.

A principal disadvantage of such conventional support arrangements is that the rubber annulus has to be bonded to the metallic band or bands. In order to properly bond the annulus, it is necessary that the bonding surfaces of the metallic bands be properly prepared. The bonding surfaces of the metallic band must be clean and should be relatively rough or porous in order to obtain a good bond between the rubber annulus and the metallic band. Generally, a glue or cement must be applied to the surfaces to be bonded. If the metallic bands are not properly bonded to the resilient annulus, the metallic band may pull away from the hub under the influence of sudden end loads or shock, particularly as may occur during shipping and handling of the motor. Thus, it is desirable in a resilient mounting for a motor to eliminate the need for bonding the metallic band or ring to the resilient annulus.

Another problem encountered in the provision of acceptable resilient mounting arrangements is that to safeguard against electric shock hazard a low resistance electrically conductive path must be provided from the motor frame to a normally grounded support base. Since the resilient annulus of rubber will ordinarily insulate the motor frame from the grounded base, it is necessary to establish a low resistance electrical connection from the motor frame to the base around the resilient annulus to insure that the motor is properly grounded. It is desirable that this grounding connection be readily installed.

In Patent 2,740,073 to L. W. Wightman there is described a double S-shaped grounding member in which one end of the grounding member is inserted between the inner metallic band and the hub to provide a connection to the motor frame. The other end of the grounding member is inserted between the outer metallic band and cradle to provide an electrical connection to the base which is usually grounded. The center portion of the double S-shaped grounding member is arranged in an opening in the resilient annulus. Although this arrangement has been successful in practice, it has been found that due to the metal-to-metal contact, breakage of the connection between the outer band and the cradle may occur. Also, when the motor is disassembled from the support base or cradle, the U-shaped grounding member may fall out and inadvertently may not be replaced when the resilient annulus is reassembled on the hub. It is therefore desirable to provide a resilient mounting arrangement wherein the grounding member is an inherent part of the annulus assembly and is securely retained therein.

Accordingly, it is a general object of the present invention to provide an improved resilient mounting arrangement for supporting a rotating machine such as an electrical motor.

A more specific object of the present invention is to provide an improved resilient mounting arrangement for a rotating machine such as a fractional horsepower motor, wherein it is not required that the outer metallic band be bonded to the annulus of resilient material.

It is another object of the present invention to provide an improved resilient mounting arrangement in which the grounding member is positively held in engagement with the resilient annulus.

A further object of the invention is to provide an improved resilient mounting arrangement for an electric motor in which a rubber resilient annulus can be readily assembled in nonrotational engagement with a metallic outer ring or band.

In accordance with one form of the invention, I have provided an improved resilient mounting arrangement for a rotating machine, such as an electric motor, in which a plurality of circumferentially spaced axial slots are formed on the outer periphery of a resilient annulus. Preferably, the axial slots extend over not more than one-half of the outer periphery of the resilient annulus. A channel-shaped metallic split ring with split ends is disposed around the outer periphery of the annulus and includes a plurality of tabs engaged in the axial slots to prevent relative rotational movement between the ring and the annulus. Further, the channel-shaped metallic ring may be formed with a pair of circumferentially extending grooves to aid in maintaining the axial position of the ring. Such a groove arrangement also facilitates the assembly of the resilient annulus in the ring since the grooves provide a passage for the release of air trapped between the annulus and ring during assembly.

According to a more specific aspect of the invention, a pinch groove essentially aligned with the split ends of the channel-shaped split ring is preferably provided at a location on the outer periphery of the resilient annulus spaced from the outermost of the axial slots. The pinch groove serves as an index for aligning the axial slots of the resilient annulus with respect to the tabs extending from the split ring to thereby insure proper assembly of the resilient annulus in the split ring. Further, when the assembly consisting of the resilient annulus and split ring is clamped to a support base, pinching and extrusion of the resilient annulus at the split ends of the ring are prevented.

In another specific aspect of the invention, I have provided a grounding member with a resilient central portion engaged in a through-hole provided in the resilient annulus. Also, the grounding member includes an outer and an inner contact portion. The inner contact portion is engaged between the hub of the motor and the annulus to establish preferably, a radial and an axial contact with the hub. The outer contact portion is engaged between the annulus and the channel-shaped ring to preferably establish a radial and an axial contact with the ring for grounding the motor to the base. In such an arrangement the grounding member is, in effect, locked in position between the annulus and the split ring to thereby prevent an accidental dislocation of the grounding member when the ring an annulus assembly is removed from the motor. Further, the through-hole permits a visual check to be made to insure that the grounding member has not been omitted in the assembly or reassembly operation.

The subject matter which I regard as my invention is particularly pointed out and distinctly claimed in the concluding portion of the specification. My invention, however, together with further objects and advantages thereof may be best understood by reference to the following description taken in conjunction with the accompanying drawings in which:

FIGURE 1 is a fragmentary perspective end view of a motor of the improved resilient mounting arrangement embodying the invention;

FIGURE 2 is a fragmentary side view of one end of the motor, partly in section and broken away to show various details of the improved resilient mounting arrangement;

FIGURE 3 is a fragmentary end view of the motor support base, partially broken away to show details of the improved resilient mounting arrangement and the end cap removed;

FIGURE 4 is an exploded view illustrating the assembly of the grounding member, resilient annulus, split ring and end cap on the hub of a motor to provide the improved resilient mounting arrangement;

FIGURE 5 is an enlarged sectional view taken generally along lines 5—5 of FIGURE 1; and FIGURE 6 is an enlarged sectional view of the assembly consisting of the resilient annulus and channel-shaped ring to aid in describing how the circumferentially extending grooves provide a path for the escape of air entrained between the annulus and ring.

Having more specific reference now to the drawings, I have shown therein the improved resilient mounting arrangement applied to a fractional horsepower motor 10 having a frame 11. In the interest of simplification I have illustrated the mounting arrangement for the right side of the motor 10, as seen in FIGURES 1 and 2. It will be appreciated that an identical mounting arrangement may be used at the other side of the motor 10. As is best seen in FIGURE 2, an end shield 12 is secured to the frame 11 by the through-bolts 13 and includes a hub 14 on which the motor shaft 9 (see FIGURE 3) is journaled. In order to cushion the vibration of the motor 10 a resilient annulus, preferably, of rubber, is arranged on the outer periphery of the hub 14 between the support base 16 and the hub 14.

The support base 16 includes a cradle portion 17 adapted to receive a channel-shaped split ring 18 disposed around the resilient annulus 15. The split ring 18 and the resilient annulus 15 are secured in the cradle portion 17 by a pair of clamping elements 20, 21 having slots engaged in ears 22, 23 of the support base 16. A screw 24 projecting through the angled portions 25 and 26 of the clamping elements 20 and 21, respectively, is provided to draw the clamping elements 20, 21 together and force the split ring 18 into compressive engagement with the resilient annulus 15. Also, the split ring 18 is drawn into firm frictional engagement with the cradle portion 17 of the support base 16.

To prevent relative rotational movement between the hub 14 and the resilient annulus 15, the hub 14 is provided with a plurality of axially extending projections 27 which engage complementary grooves 28 formed along the inner periphery of the resilient annulus 15. An end cap 19 seals the central opening of the hub 14. With the projections 27 of the hub 14 engaged in the grooves 28 of the resilient annulus 15, torsional vibration is cushioned, and relative rotation between the resilient annulus 15 and the hub 14 is prevented.

It will be noted that the outer periphery of the resilient annulus 15, as is shown in FIGURE 4, is formed with a series of circumferentially spaced and axially extending slots 29 which extend over not more than one half of the outer periphery. As will hereinafter be more fully explained, the axially extending slots 29 on the outer periphery are engaged in tabs 30 cut out of the channel-shaped metallic ring 18. Also, an axially extending pinch groove 31 spaced from the outermost of the slots 29 is located on the outer periphery so that it will be aligned with the split side of the channel-shaped ring 18 when assembled therein. It was found that by locating a pinch groove 31 under the split ends of the ring 18 a point of release was provided for the rubber when compressed, and pinching resulting from misalignment of the ring 18 was prevented. Further, the pinch groove 31 permits the annulus 15 to be readily aligned within the channel-shaped ring 18 in the process of assembly. When this pinch groove 31 is aligned with the split ends of the ring 18, the axial slots 29 are in position for engagement with the tabs 30. With the tabs 30 engaged in the slots 29 relative rotational movement of the split ring 18 relative to the resilient annulus 15 is prevented.

To prevent air from being trapped between the resilient annulus 15 and the channel-shaped ring 18 when the annulus 15 is assembled therein, a pair of circumferentially extending grooves 32 and 33 are provided. Also, the openings 34 formed by cutting out the tabs 30 from ring 18, provide a means for the escape of air as the lower half of the resilient annulus 15, as seen in FIGURE 4, is assembled within the lower half of the split ring 18.

As may be best seen in FIGURE 5, a through-hole or through-opening 35 is formed in a radial face of the resilient annulus 15 for receiving a central portion 37 of the grounding member 36. The grounding member 36 includes the central portion 37, which is engaged in the through-hole 35 and contact portions 38 and 39. Contact portions 38 and 39 provide the required electrical connection between the metallic ring 18 and the hub 14. It will be seen that contact portion 38 is sandwiched between the ring 18 and the resilient annulus 15 to establish an axial and a radial contact with the ring 18. The other contact portion 39 is sandwiched between the inner periphery of the resilient annulus 15 and the hub 14 and also establishes both an axial and radial contact with the hub 14. In particular, it will be noted that the contact portion 39 extends inwardly beyond contact portion 38 and conforms to the annular extension 41 formed on the annulus 15. This arrangement insures that when the annulus 15 is compressed the contact portion 39 will be forced in both an axial direction and a radial direction against the hub 14 to insure that a good electrical connection is made with the hub 14.

With the channel-shaped ring 18 assembled on the resilient annulus 15, the side wall 40 effectively locks the grounding member 36 in position. When the assembly consisting of the resilient annulus 15 and the ring 18 is removed from the hub 14, accidental disengagement of the grounding member 36 is prevented. Further, this assembly can be handled during the assembly operation without displacing the grounding member 36. The through-hole or through-opening 35 permits a visual check to be made to insure that the grounding member 36 was not omitted.

To assemble the resilient annulus 15 within the channel-shaped ring 18, the grounding member 36 is first placed in assembled relation with the resilient annulus 15. The assembly of the resilient annulus 15 and grounding member 36 is then inserted in the channel-shaped ring 18 with the pinch groove 31 aligned with the split ends of ring 18. It will be observed that with the resilient annulus 15 so aligned, the tabs 30 formed in the lower half of ring 18 will engage the mating slots 29 of the resilient annulus 15. As the lower half of the resilient annulus 15 is inserted into the ring 18, the openings 34 adjacent to the tabs 30 allow entrained air to escape. Further, as is shown in FIGURE 6, the circumferentially extending grooves 32 and 33 formed along the edges of the channel-shaped ring provide a path for the escape of air to the split ends of the ring 18 as the outer periphery of the annulus 15 is progressively brought in contact with the ring 18. With this improved arrangement, it was found that the resilient annulus 15 could be properly seated and firmly held in the channel-shaped ring 18 without need for an adhesive between the annulus 15 and ring 18. It will be apparent therefore that with the improved arrangement bonding between the ring 18 and the resilient annulus 15 has been eliminated thereby simplifying the manufacturing operations required. Also, with the tabs extending over less than one-half of the split ring 18, it was found that the fabrication of the split ring 18 was greatly facilitated since this arrangement made it possible to use semiautomated stamping techniques to fabricate the ring 18. Further, the grounding member 36 cannot be readily disengaged from the assembly consisting of the resilient annulus 15 and the ring 18 because the side wall of the channel-shaped ring 18, in effect, locks the grounding member 36 in assembled relation, and accidental disengagement of the grounding member is prevented.

After the assembly consisting of the resilient annulus 15, the split ring 18 and grounding member 36 is completed, it is placed on the hub 14, and the end cap 19 is attached to the hub 14. The entire assembly is then placed in the cradle portion 17 of the support base 16 and the clamping elements 20 and 21 are assembled by hooking the slots on the ears 22 and 23 and tightening the screw 24 to draw the clamping elements 20, 21 together. The grooves 32 and 33 define an annular depression 40 on the outer periphery of the split ring 18, and the lower half of the annular depression 42 is engaged in the cradle portion 17 to securely position the motor 10 in an axial position. The buttons 43, 44 on the clamping elements 20 and 21 are engaged in the annular depression 42 to firmly hold the upper half of the split ring 18 in proper axial alignment.

From the foregoing description it will be apparent that an improved resilient mounting arrangement has been provided that can be readily and economically produced. Although the resilient annulus is not bonded to the split ring, the improved arrangement is capable of resisting torsional and axial movements to the same degree as if the parts were bonded. Also, the improved arrangement permits rotational movement of the motor relative to the base without adversely affecting the connection to ground.

While the present invention has been described by reference to a specific exemplification thereof, it will be apparent that many modifications may be made by those skilled in the art without actually departing from the invention. It is, therefore, intended in the appended claims to cover all such equivalent variations that fall within the true spirit and scope of the invention.

What I claim as new and desire to secure by Letters Patent of the United States is:

1. A resilient mounting arrangement for a rotating machine having an axially extending hub with a plurality of axially extending projections, said resilient mounting arrangement comprising: an annulus of resilient material having an inner periphery with complementary portions for engagement with the axially extending projections of the hub, said annulus having a plurality of axially extending and circumferentially spaced slots extending essentially over not more than a half of the outer periphery of the annulus, said annulus also having an axially extending pinch groove spaced from said slots, a metallic channel-shaped ring having split ends aligned with said pinch groove and having a plurality of radially extending tabs cut out from said channel-shaped ring and engaged in said axially extending slots to restrain relative rotational movement between said annulus and said channel-shaped ring, and means for effecting an electrical connection between said channel-shaped ring and said hub.

2. A resilient mounting arrangement for a rotating machine having a hub with a plurality of axially extending hub projections, said resilient mounting arrangement comprising: a resilient annulus having an inner periphery with complementary portions for engagement with the axially extending hub projections, said annulus having a plurality of circumferentially spaced axial slots extending over not more than one-half of the outer periphery of said annulus, and a channel-shaped metallic split ring having a plurality of tabs engaged in said axial slots to prevent relative rotational movement between said annulus and said channel-shaped metallic ring, said channel-shaped metallic ring having arcuate corners defining a pair of circumferentially extending grooves and axially spaced to provide passages for the release of air during the assembly of said annulus within said channel-shaped metallic ring.

3. In an electric motor having a hub and a base for supporting said hub, the improvement comprising: an annulus of resilient material nonrotatably mounted on said hub, said annulus having a plurality of axially extending and circumferentially spaced slots formed on the outer periphery thereof, said annulus having a through-opening formed therein, a channel-shaped metallic ring disposed around the outer periphery of said annulus and having a plurality of tabs engaging said slots, and a grounding member having a resilient central portion disposed in said through-opening and also having an inner and an outer contact portion, said inner contact portion extending between said hub and resilient annulus to establish a radial and an axial contact with said hub, and said outer contact portion of said grounding member disposed between said resilient annulus and said channel-shaped ring to establish an axial and a radial contact with said metallic ring.

4. A resilient mounting arrangement for a rotating machine having an axially extending hub, said resilient mounting arrangement comprising: a resilient annulus nonrotatably mounted on said hub, said annulus having a plurality of axial slots on the outer periphery thereof, said annulus also having a through-opening formed therein and an axially extending pinch groove, a channel-shaped metallic ring having a plurality of radially extending tabs engaged respectively in said axial slots of said annuus, said channel-shaped ring having split ends aligned with said pinch groove, a grounding member having a resilient central portion and a pair of contact portions, said inner spring portion being disposed in said through-opening of said annulus, one of said contact portions resiliently engaged between said annulus and said channel-shaped ring, and the other contact portion extending between the inner periphery of said annulus and said hub.

5. In an electric motor having an axially extending hub, a support base with a cradle portion for supporting said hub, and means for effecting an electrical connection between the support base and said hub, the improvement comprising: a resilient annulus nonrotatably mounted on said hub, said resilient annulus having a plurality of circumferentially spaced axial slots formed in a portion of the outer periphery of said resilient annulus, and a channel-shaped metallic split ring disposed around the outer periphery of said resilient annulus and clamped against the cradle portion of the support base, said channel-shaped metallic split ring having a plurality of tabs extending therefrom cooperatively engaging respectively with said plurality of circumferentially spaced axial slots in said resilient annulus to restrain relative rotational movement between said resilient annulus and said channel-shaped split ring.

6. In a resiliently mounted motor having an end shield with a hub, said hub having a plurality of axially extending projections, an annulus of resilient material having an inner periphery formed with complementary portions engaging said axially extending portions of the hub to prevent rotation of said annulus relative to said hub, said annulus also having a plurality of circumferentially spaced axial slots extending over not more than one half of the outer periphery of said annulus and having a pinch groove at a location on said outer periphery of said annulus intermediate of the outermost of said axial slots, a channel-shaped metallic ring having split ends essentially aligned with said pinch groove and having a plurailty of tabs extending respectively into said axial slots, said tabs having openings adjacent thereo, said channel-shaped metallic ring also having a pair of circumferentially extending grooves, said openings and said grooves providing a path for the escape of air during the assembly of said annulus within said channel-shaped metallic ring, and a grounding member having a resilient central portion engaged in said annulus and having an outer and an inner contact portion, said inner contact portion engaged between said hub portion and said annulus to establish a radial and an axial contact with said hub, and said outer contact portion engaged between said annulus and said channel-shaped metallic ring to establish a radial and an axial contact therewith for grounding the motor to the base.

References Cited by the Examiner

UNITED STATES PATENTS 720,184   2/1903   Sargent _____ 174—153

ROBERT K. SCHAEFER, *Primary Examiner.*

JOHN F. BURNS, *Examiner.*

WILLIAM B. FREDRICKS, *Assistant Examiner.*